(12) United States Patent
Wu et al.

(10) Patent No.: US 12,145,843 B2
(45) Date of Patent: Nov. 19, 2024

(54) TWINNED TWO-DIMENSIONAL TELLURIUM CRYSTALS WITH CO-EXISTING OPPOSITE CHIRALITY

(71) Applicant: Purdue Research Foundation, West Lafayette, IN (US)

(72) Inventors: Wenzhuo Wu, West Lafayette, IN (US); Yixiu Wang, South Bound Brook, NJ (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/490,802

(22) Filed: Sep. 30, 2021

(65) Prior Publication Data

US 2022/0098038 A1    Mar. 31, 2022

Related U.S. Application Data

(60) Provisional application No. 63/085,387, filed on Sep. 30, 2020.

(51) Int. Cl.
*C01B 19/02* (2006.01)

(52) U.S. Cl.
CPC .......... *C01B 19/02* (2013.01); *C01P 2002/77* (2013.01); *C01P 2002/84* (2013.01); *C01P 2004/02* (2013.01)

(58) Field of Classification Search
None
See application file for complete search history.

(56) References Cited

U.S. PATENT DOCUMENTS

| | | |
|---|---|---|
| 10,800,657 B2 | 10/2020 | Wu et al. |
| 11,685,653 B2 | 6/2023 | Wu et al. |
| 11,827,515 B2 | 11/2023 | Wu et al. |

OTHER PUBLICATIONS

Tanaka, Y et al. "Determination of the absolute Chirality . . . ". J. Phys. Condens. Matter. 22 (2010). (Year: 2010).*
Decker, Andrea et al. "Structural and Electronic Peierls . . . ". Anorg. Allg. Chem. 628. 295-302. 2002 (Year: 2002).*
Takumi, et al. "X-ray structural Analysis . . . ". J. Phys. Condens. Matter. 14. 10609-10613 (2002). (Year: 2002).*
Koczkur et al. "Polyvinylpyrrolidone in nanoparticle synthesis". Dalton Trans. 44, 17883 (2015). (Year: 2015).*
Jin Li , A. Ciani , J. Gayles , D.A. Papaconstantopoulos , Nicholas Kioussis , C. Grein & F. Aqariden (2013): Non-orthogonal tight-binding model for tellurium and selenium, Philosophical Magazine, DOI:10.1080/14786435.2013.801569 (Year: 2013).*
Park, et al. "Preparation and thermoelectric properties of two types of nanostructured tellurium with multiwalled carbon nanotubes". Journal of Alloys and Compounds. 305-313, 748 (2018). (Year: 2018).*
Hunyadi et al. "Enhanced Growth of tellurium nanowires under conditions of macromolecular crowing". Phys. Chem. 19, 16477 (2017). (Year: 2017).*

* cited by examiner

*Primary Examiner* — Sheng H Davis
(74) *Attorney, Agent, or Firm* — Hartman Global IP Law; Gary M. Hartman; Domenica N. S. Hartman

(57) ABSTRACT

Processes for synthesizing substrate-free twinned 2D tellurium crystals with co-existing opposite chirality, and twinned 2D tellurium crystals produced thereby. The substrate-free twinned 2D tellurium crystals include a first wing and a second wing, the first wing and second wing have opposite chirality, and the first wing and the second wing are joined together at an angle to form a V-shaped crystal.

4 Claims, 12 Drawing Sheets

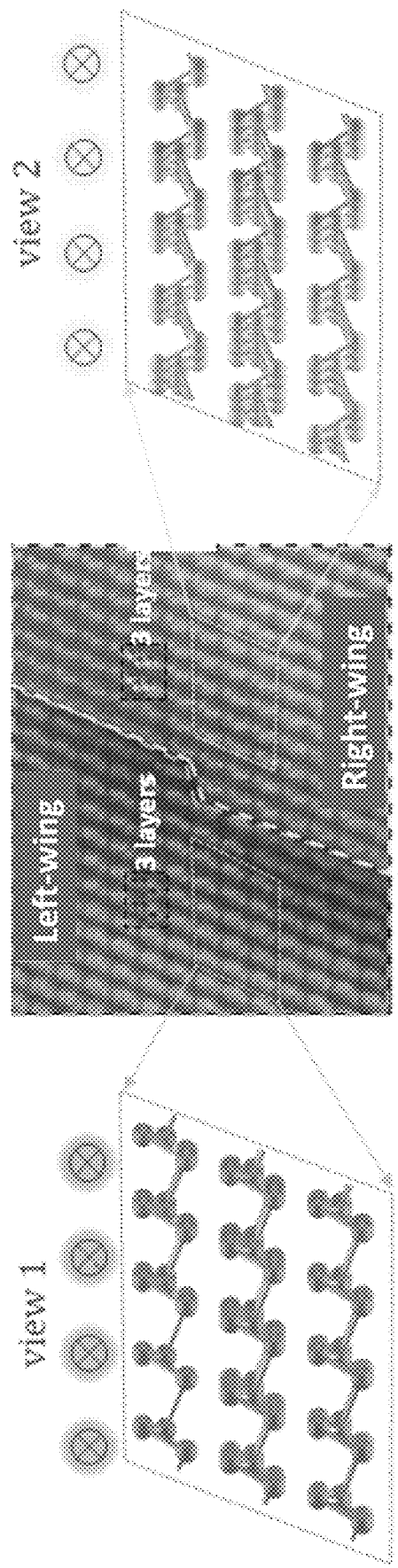

TWINNED TWO-DIMENSIONAL TELLURIUM CRYSTALS WITH CO-EXISTING OPPOSITE CHIRALITY

CROSS-REFERENCE TO RELATED APPLICATIONS

This application claims the benefit of U.S. Provisional Application No. 63/085,387 filed Sep. 30, 2020, the contents of which are incorporated herein by reference.

BACKGROUND OF THE INVENTION

The present invention generally relates to processes for producing crystalline structures, particularly tellurium crystals, that exhibit coexisting opposite chirality.

Chirality in crystal lattice symmetries describes a geometric property of a structure that is opposite in its mirror image such that the structure cannot be superimposed on its mirror image. This characteristic plays an important role in structure-function relationships and provides a basis for understanding the physics and fundamental properties of a material. The two mirror images of a chiral crystal structure, so-called left-handed and right-handed crystals, give rise to different chemical, optical, and physical responses. Materials exhibiting chiral crystal structures have attracted increased interest as promising for advanced applications such as in polarization optics, spintronics, etc.

The element tellurium (Te) is an example of a chiral material. Tellurium is a metalloid that has crystalline and amorphous allotropes. Crystalline tellurium has a crystal structure made up of spiral chains of bonded atoms packed in a hexagonal arrangement. Its symmetry makes the existence of enantiomorphic forms containing spirals of opposite handedness, the righthanded spiral form belonging to space group $P3_121$ and the lefthanded spiral belonging to space group $P3_221$. Crystalline structures possessing both lefthand and righthand chirality are sometimes referred to herein as twinned crystals with co-existing opposite chirality. A hydrothermal process has been used to synthesize large-area, single-crystal two-dimensional (2D) tellurium (tellurene) that exhibits novel optical and electric properties. However, much less has been known regarding the synthesis of 2D tellurium with chirality.

Twinning is commonly observed in inorganic crystals. Crystal facets engineering provides a powerful route for tailoring the arrangement of atoms in nanocrystals and offers opportunity for twinned structures. The crystal facet control in a hydrothermal process depends on a variety of parameters. One method involves surfactants, which can selectively adsorb to specific crystal facets of inorganic materials and promote the formation of certain facets. Another factor is the mechanical disturbance induced during a hydrothermal process, particularly inducing the propagation of screw dislocation or fault stacking. Elaborate control on the thermodynamic energetics and kinetics are of utmost importance for obtaining a twinned structure growth having a suitable atom arrangement.

It would be desirable if a process were available that was capable of being precisely controlled to synthesize twinned crystals, such as twinned 2D tellurium crystals with co-existing opposite chirality.

BRIEF SUMMARY OF THE INVENTION

The present invention provides processes that are capable of being precisely controlled to synthesize substrate-free twinned 2D tellurium crystals with co-existing opposite chirality, and to twinned 2D tellurium crystals produced thereby.

According to one aspect of the invention, a substrate-free twinned 2D tellurium crystal with co-existing opposite chirality includes a first wing and a second wing, the first wing and second wing have opposite chirality, and the first wing and the second wing are joined together at an angle to form a V-shaped crystal.

According to another aspect of the invention, a process of synthesizing substrate-free twinned 2D tellurium crystals includes a hydrothermal process in which an achiral capping agent is combined with a precursor of tellurium in an aqueous solution.

Technical aspects of processes as described above include the ability to synthesize twinned 2D tellurium (tellurene) crystals with co-existing opposite chirality, in other words, possessing both lefthand and righthand chirality, which have potential applications including but not limited to polarization optics and spintronics.

Other aspects and advantages of this invention will be appreciated from the following detailed description.

BRIEF DESCRIPTION OF THE SEVERAL VIEWS OF THE DRAWING

FIGS. 2A through 2I are images that characterize certain aspects relating to the co-existing opposite chirality of two wings of one of the twinned two-dimensional tellurium crystals of FIG. 1A.

DETAILED DESCRIPTION OF THE INVENTION

Figure 1A:
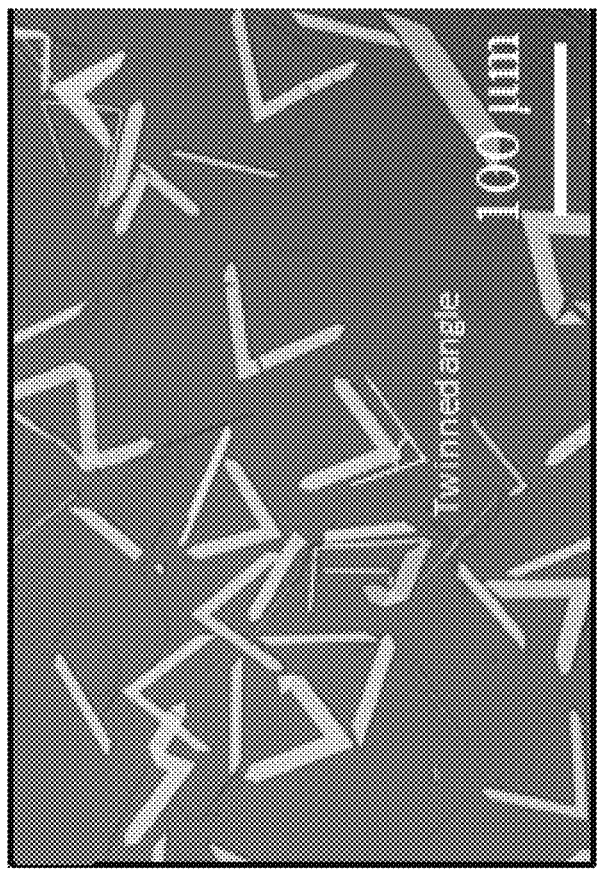
FIGS. 1A through 1K are images that characterize certain physical and crystallographic aspects of twinned two-dimensional tellurium crystals produced during an investigation.

The intended purpose of the following detailed description of the invention and the phraseology and terminology employed therein is to describe what is shown in the drawings, and to describe certain but not all aspects of what is depicted in the drawings. The following detailed description also describes certain investigations relating to what is depicted in the drawings, and identifies certain but not all alternatives of what is depicted in the drawings. Therefore, the appended claims, and not the detailed description, are intended to particularly point out subject matter regarded as the invention, including certain but not necessarily all of the aspects and alternatives described in the detailed description.

The element tellurium is a metalloid having crystalline and amorphous allotropes. Crystalline tellurium has a crystal structure made up of spiral chains of bonded atoms packed in a hexagonal array and whose symmetry leads to the existence of two opposite-handed chirality, in other words, lefthand and righthand chirality. Controllable synthesis of tellurium with both lefthand and righthand chirality could provide a means for developing polarization optics and spintronics. The following describes investigations that demonstrate a direct approach to synthesizing nanoscale twinned tellurium crystals with coexisting lefthand and righthand chirality. In particular, twinned 2D tellurium crystals with both lefthand and righthand chirality counterparts were prepared via a hydrothermal method. The ability to prepare twinned 2D tellurium of controllable chirality offers the possibility of various applications in polarization optics and spintronics.

Controllable hydrothermal processes have been previously performed to prepare substrate-free 2D tellurium (tellurene) with the use of an achiral molecule, poly(vinylpyrrolidone) (PVP), as a capping agent. In the resulting 2D morphology, most of the crystals form a quasi-trapezoid shape whose length along the [0001] direction can be up to about 100 micrometers and the length perpendicular to this direction is about 20 micrometers. The 2D tellurium crystals grow along the [0001] direction, which is parallel to the side length of quasi-trapezoid shape.

In investigations leading to the present invention, free-standing (substrate-free) 2D tellurium crystals were produced with a controllable hydrothermal process whose reaction conditions, including reaction pressure and capping agent, were controlled to yield 2D tellurium flakes having a twinned crystal formation, examples of which are shown in FIG. 1A. The hydrothermal process used poly(vinylpyrrolidone) (PVP) as the capping agent, similar to the procedure reported in Wang et al., "Field-Effect Transistors Made from Solution-Grown Two-Dimensional Tellurene," Nature Electronics 1, 228-236 (2018) (whose contents are incorporated herein by reference), to explore the productivity of producing twinned 2D tellurium flakes. The synthesis of the substrate-free 2D tellurium crystals entailed placing a precursor (sodium tellurite; $Na_2TeO_3$), poly(vinylpyrrolidone) (PVP), and double-distilled water in a PTFE-lined stainless-steel autoclave, and then dissolving the sodium tellurite and PVP in the double-distilled water under vigorous magnetic stirring to form a homogeneous aqueous solution at room temperature. Under vigorous magnetic stirring, hydrazine hydrate was added to the aqueous solution as a reducing agent and ammonia was added to render the solution alkaline. The autoclave was then closed and maintained at 180° C. for a prescribed time period, after which the autoclave was allowed to cool to room temperature.

Figure 1B:
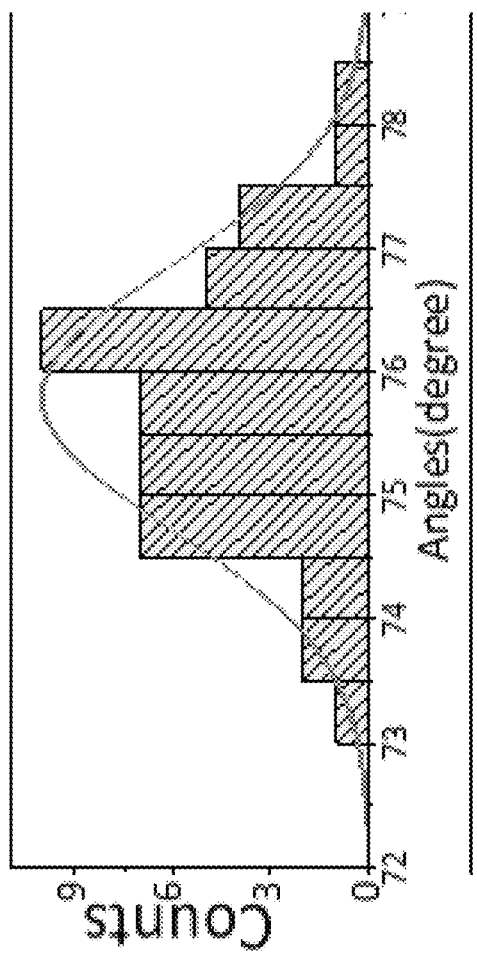

In FIG. 1A, greater than 70% of the 2D tellurium flakes are observed to be twinned 2D tellurium crystals, in other words, exhibiting opposite-handed (lefthand and righthand) chirality. Each twinned 2D tellurium flake (sometimes referred to herein as "twinned 2D tellurium crystal" or "twinned structure") that is visible in FIG. 1A possesses two arms or wings (hereinafter, "wings") that intersect to define a V-shaped crystal, with the wings of any given twinned 2D tellurium flake having similar lengths and widths. The widths of the wings ranged from about 10 to about 20 micrometers and the lengths of the wings were up to about 100 micrometers. The angle between the outside edges of each pair of wings ("Twinned angle" in FIG. 1A) was measured by optical imaging. Fifty twinned structures were randomly selected to assess the distributions of their angles. As represented in FIG. 1B, the angles ranged from 73 to 78.5 degrees. The statistical angle values were distributed over a relatively narrow range of 76.2±0.80 degrees. Atomic force microscopy (AFM) evidenced that the wings of the examined twinned structures had smooth surfaces. In addition, the thicknesses of the wings (measured perpendicular to their widths) of each twinned structure were nearly the same value. As a nonlimiting example, in one of the twinned structures both wings had a thickness of 19.5 nm.

Figure 1E:
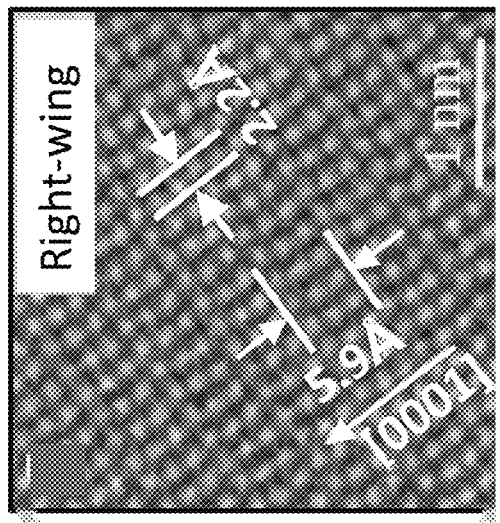
Figure 1D:
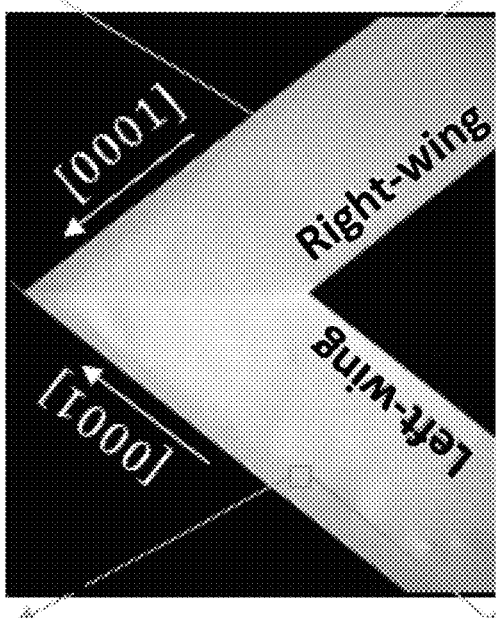
Figure 1C:
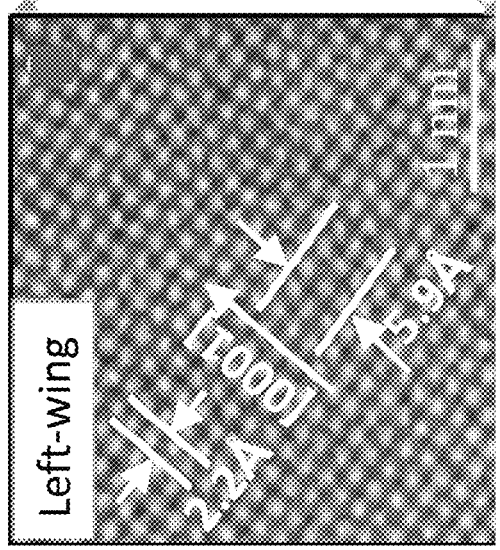

Transmission electron microscopy (TEM) was performed on a single twinned structure to examine its detailed crystal information. A low magnification TEM in FIG. 1D depicts the morphology of the twinned structure, where the two wings exhibit mirror symmetry and adjoin each other at well-defined crystal boundary. FIGS. 1C and 1E are high-resolution transmission electron microscopy (HRTEM) images of each wing of FIG. 1D, where the electron beam was perpendicular to the visible surface of the flake. No obvious point defects or dislocations were observed in the images, which show two sets of distinct lattice-spacings of 0.22 and 0.59 nm that correspond to the (0001) and (1210) planes of the tellurium crystal. The HRTEM results confirmed the longitudinal edge of the twinned 2D tellurium flake is in the [0001] direction, as is shown in FIG. 1E, and the helical chains with a threefold screw symmetry were along the [0001] direction.

Figure 1F:
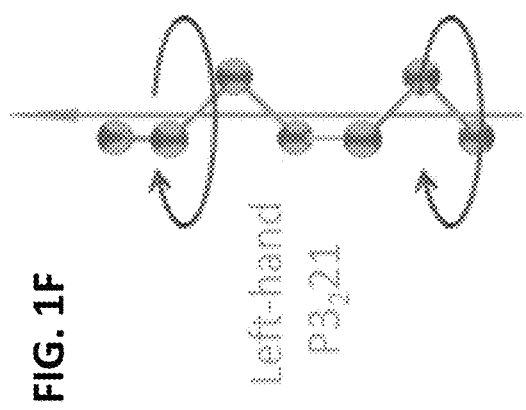
Figure 1H:
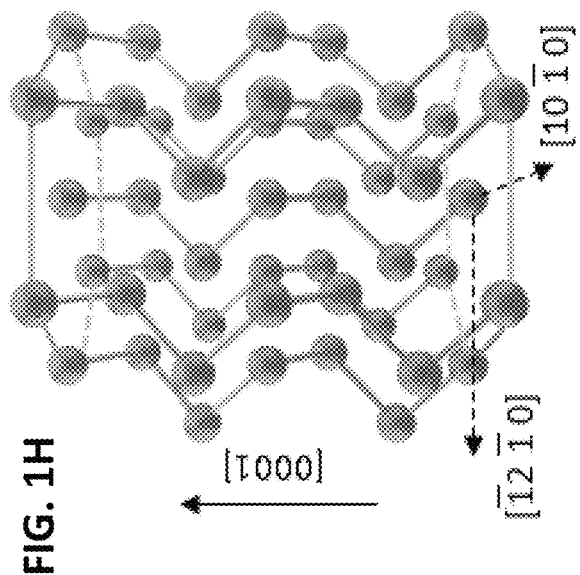
Figure 1J:
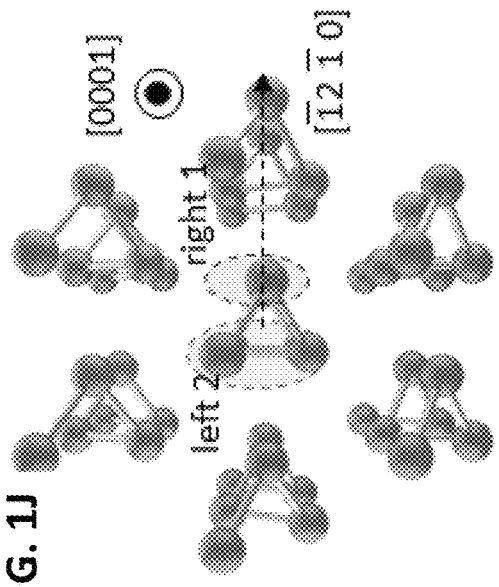
Figure 1G:
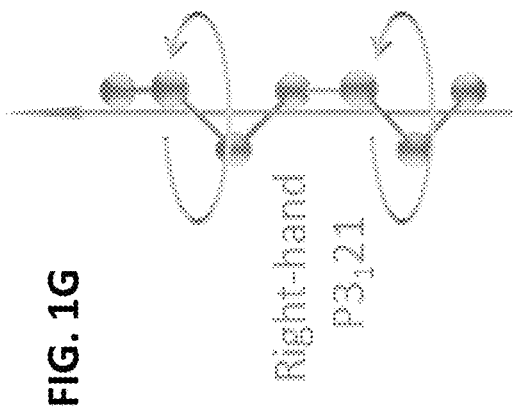
Figure 1I:
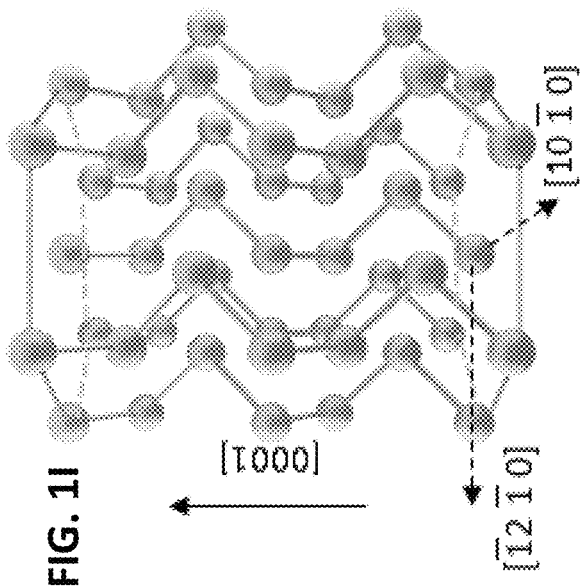
Figure 1K:
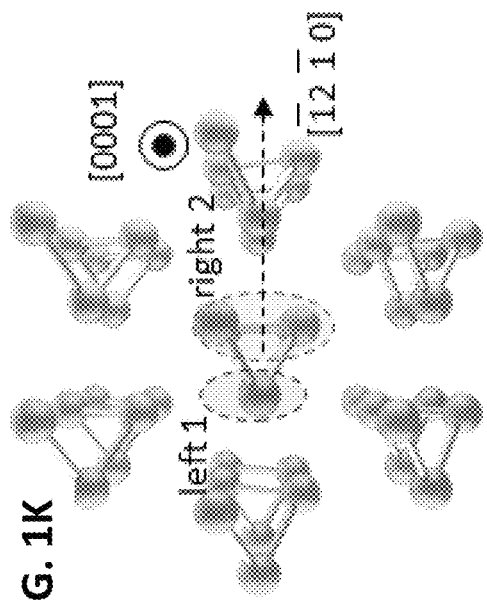

As has been previously reported, the crystal structure of tellurium has an enantiomorphic space group pair, namely, $P3_121$ (#152) and $P3_221$(#154), with two screw directions by different stacking sequences of atom planes along the [0001] direction. The sequence of each space group is in opposite directions, as schematically represented in FIGS. 1F and 1G. For convenience, the lefthand direction represented in FIG. 1F will be noted as "L-Te" and the righthand direction represented in FIG. 1G will be noted as "R—Te." FIGS. 1H and 1I schematically represent a 3×3×6 unit cell with bonds to the nearest unit cell for $P3_121$ (#152) and $P3_221$(#154) space groups. From this view direction projected parallel to [1010], the periodic spiral chain on the wings can be observed, but not their chirality. FIGS. 1J and 1K schematically represent the crystal structure projected parallel to the [0001] direction, which shows the different atom arrangement for L-Te and R—Te. Examination revealed that three tellurium atoms per turn in each chain form an equilateral triangle shape for both L-Te and R—Te in this view direction. For L-Te with the $P3_121$ space group in FIG. 1J, two triangle vertices (encircled by a dashed line) are located on the left side of each three-atom arrangement, and the third triangle vertex (encircled by a dashed line) is located on the right side of each three-atom arrangement. Comparably, for the R—Te in FIG. 1K, a single triangle vertex (encircled by a dashed line) is located on the left side of each three-atom arrangement, and the remaining two triangle vertices (encircled by a dashed line) are located on the right side of each three-atom arrangement. From this, it was concluded that the view angle from the [0001] direction may help to identify the tellurium chirality.

Figure 2C:
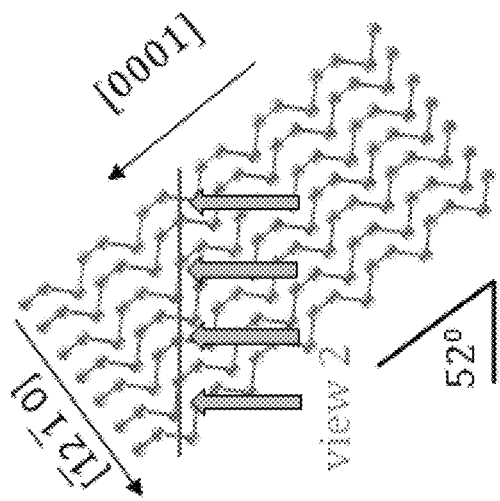
Figure 2A:
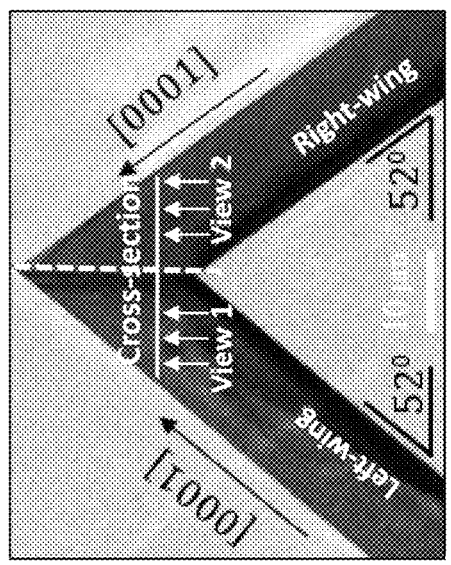
Figure 2B:
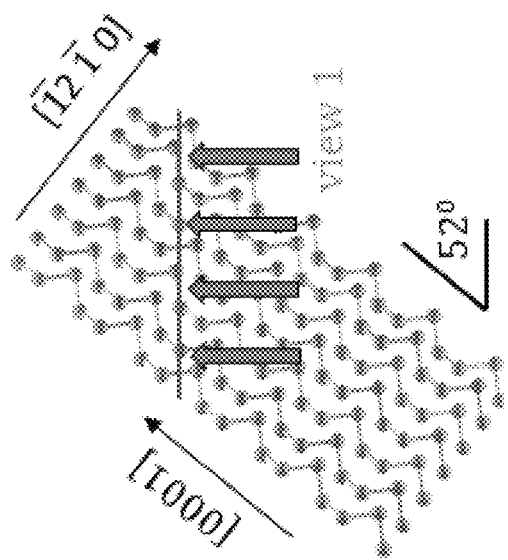

To examine the chirality of the twinned structures, a cross-section TEM was performed on a single twinned 2D tellurium flake shown in FIG. 2A. A dash line in FIG. 2A marks the well-defined boundary between the two wings. The cross-section TEM captured the twinned 2D tellurium flake at the boundary as indicated by the solid line and view angles indicated by "view 1" and "view 2" in FIG. 2A. 3D atom structures at the boundary are schematically represented in FIGS. 2B and 2C and depict the crystal orientations of the two wings. Both view 1 and view 2 in FIGS. 2B and 2C are 38 degrees to the [0001] direction and 52 degrees to the [1010] direction.

Figure 2F:
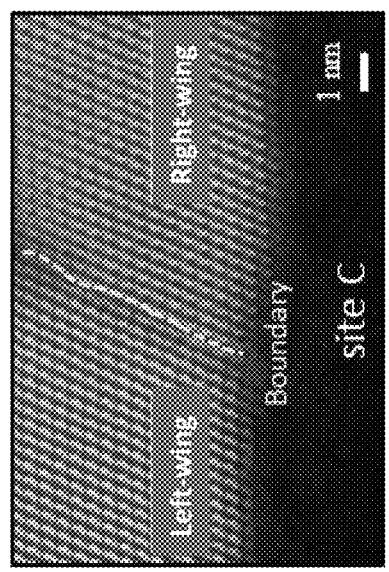
Figure 2D:
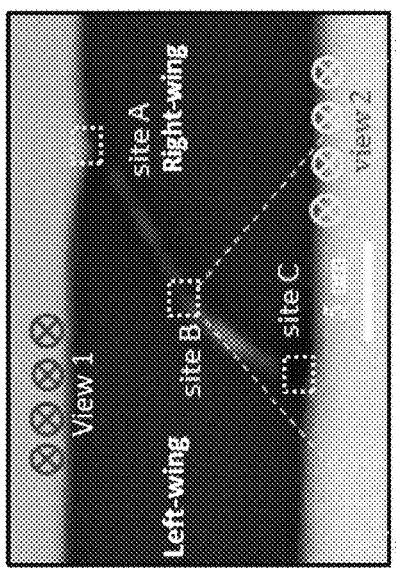
Figure 2E:
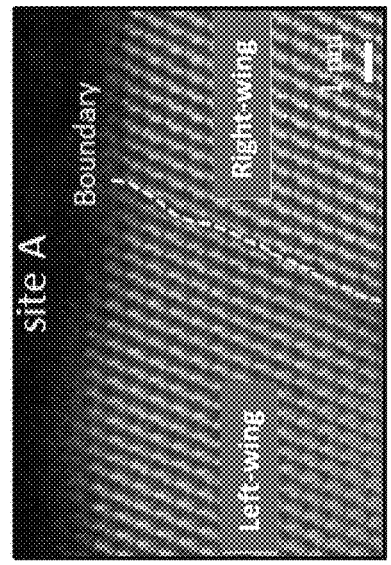

FIG. 2D shows the cross-section TEM captured from FIG. 2A. The cross-section of the twinned 2D tellurium flake was determined to have a thickness of about 15 nm. The left-wing and right-wing are separated at the boundary in FIG. 2D by a white contrast line. The view 1 and view 2 marked in FIG. 2D indicate the crystal orientation relationship to FIG. 2A. The atom arrangement near the boundary was investigated by HRTEM. Three sites, identified with dashed squares labeled as site A, site B, and site C in FIG. 2D, were selected. FIGS. 2E, 2F, and 2G show HRTEM images obtained at sites A, C, and B, respectively. As noted above, views 1 and 2 were 38 degrees to the [0001] direction, so the projection of the tellurium crystal structure parallel to view 1 and view 2 is different from the projection parallel to the [0001] direction. The three tellurium atoms per turn in each chain form an obtuse triangular shape. Importantly, the obtuse triangular shapes in the left wing (the lefthand area in FIG. 2G) and right wing (the righthand area in FIG. 2G) manifest the mirror symmetry with the boundary as a center line.

To further verify the chirality of the twinned 2D tellurium flake, the 3D atom arrangement from view 1 is schematically represented for the L-Te in FIG. 2H and the 3D atom arrangement from view 2 is schematically represented for the R—Te in FIG. 2I. As is clearly represented in FIG. 2H for the L-Te space group, the three tellurium atoms per turn were also arranged as an obtuse triangle shape and the obtuse corner was located on the right side, which matches well with the HRTEM of the left wing in FIG. 2G. Comparably, view 2 in FIG. 2I for the R—Te shows the obtuse corner disposed on the left side, which is consistent with the HRTEM on the right wing in FIG. 2G. Therefore, it was concluded that the twinned 2D tellurium flake possessed two co-existing opposite-handed (lefthand and righthand) chirality on the right and left wings.

Figure 3B:
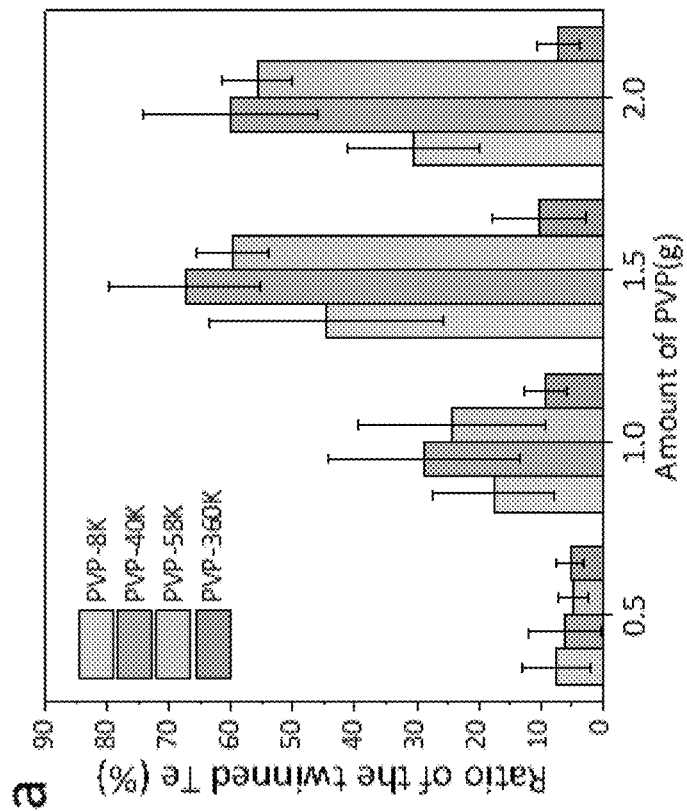
FIGS. 3A through 3F contain graphs relating to the synthesis of the twinned two-dimensional tellurium crystals of FIG. 1A and properties of the twinned two-dimensional tellurium crystals relating thereto.
Figure 3A:
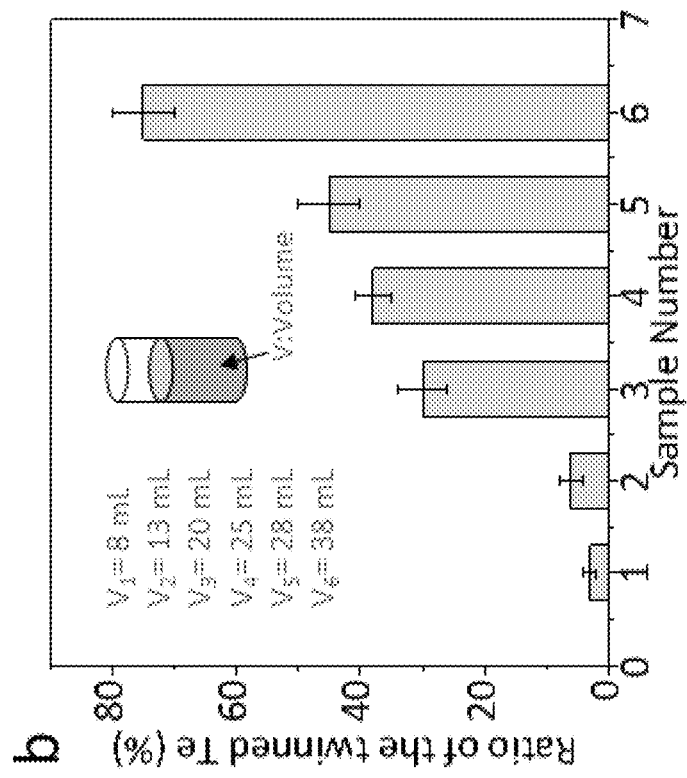

Ratios of the twinned tellurium (Te) produced by the hydrothermal process are identified in FIGS. 3A and 3B. These twinned tellurium ratios were defined as the counts of the twinned structures relative to all of the flakes produced under a set of production parameters. FIG. 3A plots the production of twinned 2D tellurium flakes using four different amounts of PVP having four different molecular weights (molar mass) ranging from 8K to 360K g/mol. As evident from FIG. 3A, the final production of the twinned 2D tellurium flakes was largely affected by the PVP molecular weight. Production with PVP having a molecular weight of 360K g/mol was observed to have the lowest final productivity. Even with different PVP amounts, the twinned tellurium ratio was less than 10%. FIG. 3A evidences that the molecular weight PVPs (40K and 58K g/mol) were associated with significantly increased twinned crystal production, with twinned tellurium ratios of nearly 70% obtained with an amount of 1.5 g of the PVP having a molecular weight of 40K g/mol. Excluding the inferior productivity associated with the PVP having a molecular weight of 360K g/mol, it was determined that the amount of PVP used to produce the twinned 2D tellurium flakes had a significant impact. Production with PVP molecular weights of 8K, 40K and 58K g/mol indicated an increased tendency for producing twinned 2D tellurium flakes with increases in the amount of PVP from 0.5 to 1.5 g. However, excess PVP resulted in a decrease in productivity.

Productivity was also affected by the pressure in the reaction container. As shown in FIG. 3B, the productivity increased with increasing pressure.

Figure 3C:
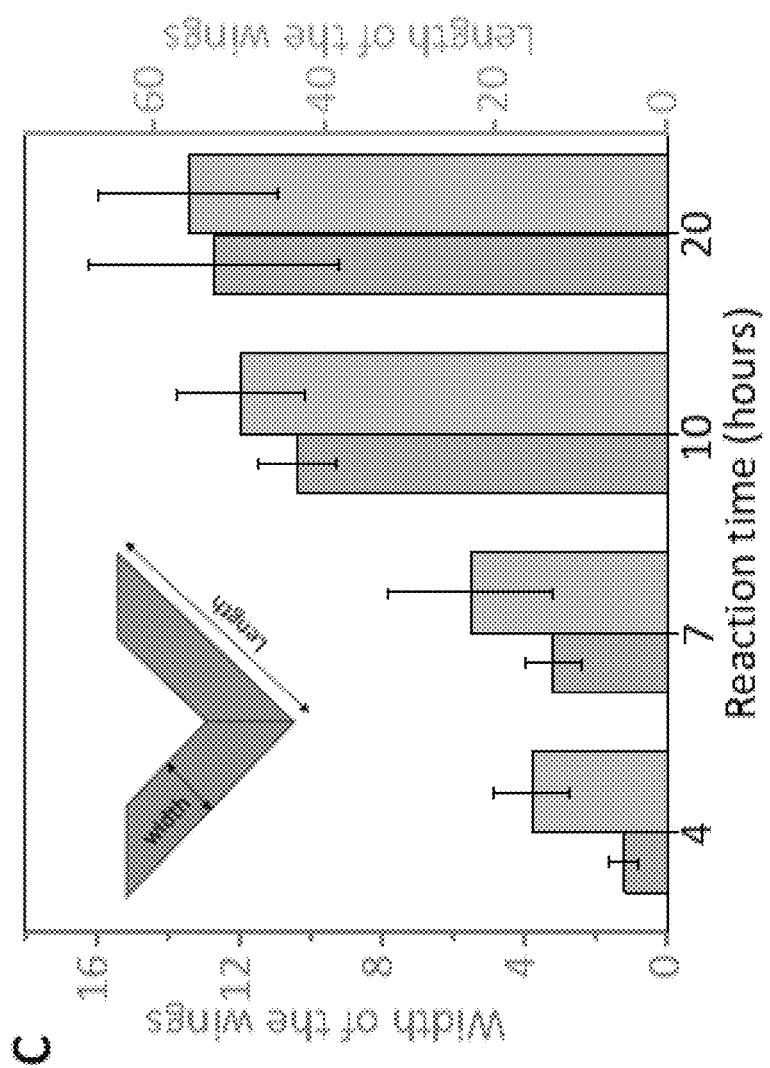

The effect of reaction time on the size of the twinned 2D tellurium flakes with 1.5 g of PVP having a molecular weight of 40K g/mol was also investigated. As indicated by FIG. 3C, the lengths and widths of the wings of the twinned 2D tellurium flakes increased with increased reaction time. With a reaction time of four hours, twinned structures were produced with wings having widths and lengths of 2 micrometers and 10 micrometers, respectively. Prolonging the reaction time to twenty hours resulted in the production of twinned 2D tellurium flakes whose wings had widths and lengths of 15 micrometers and up to 50 micrometers, respectively. With extended reaction times, the crystal surfaces of the twinned structures became partially covered due to what was attributed to be insufficient PVP passivation.

For subsequent investigations, three groups of twinned 2D tellurium flakes were produced from the same concentration of PVP to have twinned tellurium ratios of 71.2±10.2%, 55.6±7.4%, and 20.4±6.2%.

Figures 3D, 3E, 3F:
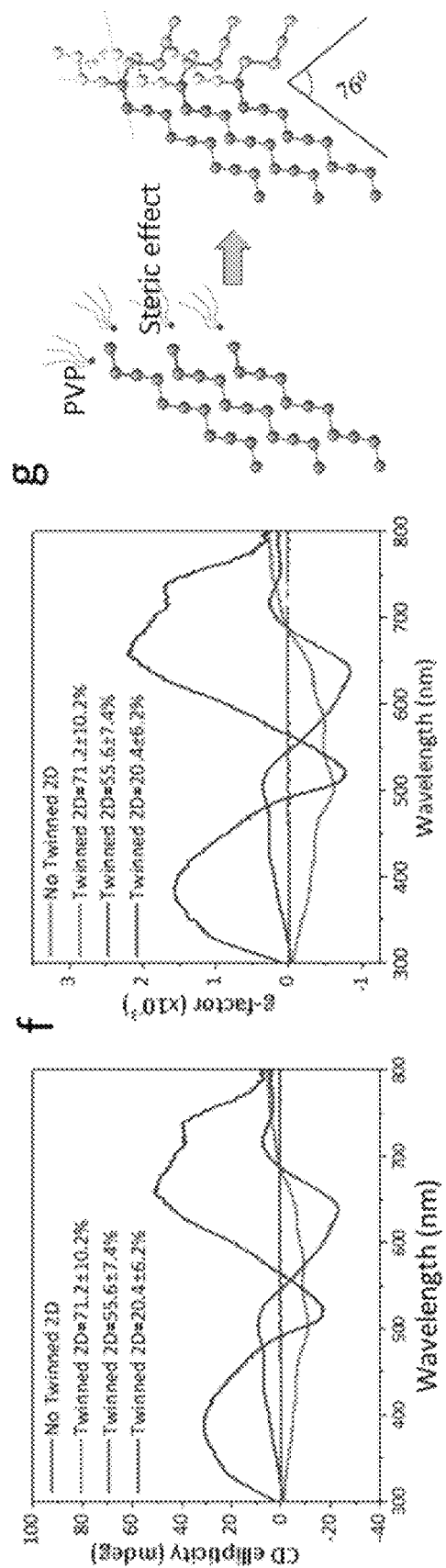

Circular dichroism (CD) is a useful spectroscopic technique for the investigation of chiral samples having an absorption band in a given spectral region, which measures the differential absorption of left and right circularly polarized light by chiral materials. In FIG. 3D, the CD signals of three twinned 2D tellurium flakes having the different above-noted twinned tellurium ratios (71.2±10.2%, 55.6±7.4%, and 20.4±6.2%) and pure PVP dissolved in deionized water ("No Twinned 2D") are plotted. In the twinned 2D tellurium flakes produced by the investigation, the tellurium crystals were capped by PVP, which is an achiral molecule and therefore the CD signs in FIG. 3D were attributed to the chirality of the twinned structures derived from their chiral atomic arrangements. The CD signal of PVP in FIG. 3D is close to 0 due to its achiral property.

Anisotropic g-factor is a key parameter of chiral crystals to determine their optical activity due to its ready availability by comparing the CD spectrum with the absorption spectrum, which can be written as $$g\text{-factor}=\text{ellipticity}(m\text{deg})/A\times 3.3\times 10^4$$

where A is the value in the absorption spectrum. The anisotropic g-factor can be observed in FIG. 3E as arising from CD, suggesting applications in non-linear optics.

The absorption differences in FIG. 3E suggested that the CD ellipticity increased with a decrease of the twinned tellurium ratio. Specifically, the CD ellipticity of the 71.2±10.2% sample was about −10 mdeg in the wavelength range of 450-550 nm, whereas the 20.4±6.2% sample exhibited a value as large as about −20 mdeg in this range and exhibited a positive peak of about 50 mdeg in the wavelength range of 600-700 nm. Several considerations lead to possible explanations for these results. The 71.2±10.2% sample consisted of a mixture of R—Te and L-Te enantiomers, and the absorption difference with the R—Te and L-Te cancel each other. Therefore, more twinned structures present in the higher twinned tellurium ratio sample resulted in less CD signal. In the 20.4±6.2% sample, a large excess of one enantiomer in solution led to a higher CD signal. This CD result further proved the coexist of the opposite enantiomers in the twinned structures, but also suggests non-linear optical properties for a 2D semiconductor formed of twinned 2D tellurium crystals.

Based on the above experimental observations, some hypotheses were made to explain the formation of the twinned 2D tellurium crystals. In an ideal situation, the tellurium nucleus in static solution is able to grow in both axial and radial direction. The 2D tellurium morphology is governed by the different surface free energy and the adsorbed capping agent. Using PVP as the capping agent, the lowest surface energy and binding energy to PVP of (0001) surfaces according to previous calculations enable the tellurium crystal to preferentially grow in the [0001] direction. In the absence of external intervention, the crystal finally forms a trapezoid shape, as previously noted. However, by adding more PVP to the solution, the enhanced steric effect would limit the tellurium crystal growth in the [0001] direction. At the same time, the reactions occurred under vigorous stirring, and the continuously-growing crystals were subjected to shearing stresses imposed by the solution. As is shown in FIG. 3F, the new incoming tellurium atom would relocate to a new position, leading to fault stacking. To minimize the interfacial free energy of coherent twin boundaries, the new bond twists to stabilize the structure and the perfect fit of the nearest neighbor atoms across the boundary has been stacked (FIG. 3F). In addition, the total free energy would be minimized near the coherent twin boundary with both lefthand and righthand chirality (discussed below). As a result, the twinned structure was formed with both opposite enantiomorph and had an angle of 76.6 degrees to the original crystal face. Due to the preferred growth in [0001], the twinned structures would grow wider and longer, following the protruding mechanism. This process significantly depends on the binding effect on (0001). Less PVP would result in the intrinsic growth in 1D and yield a belt-like morphology. More PVP would cause a homogenous blocking effect, leading to the formation of a nanorod. Therefore, in FIG. 3A it was observed that an increased amount of PVP increased the productivity of the twinned structure, though too much PVP was harmful to the formation of the twinned structure. Another factor is the shearing force created by the vigorous stirring in the hydrothermal environment. As seen in FIG. 3B, the productivity of the twinned 2D tellurium flakes is plotted in relation to solvent volume with a constant PVP concentration. Different mechanical disturbances are induced by different solvent volumes, and in FIG. 3B the twinned tellurium ratio increases with increasing solvent volume. Consistent with the discussion above, the presence of the fluctuation in the hydrothermal process is believed to break the equilibrium of the 1D growth occurring in a static solution. The higher shearing force in the larger solvent volume could deform the origin stacking direction, giving rise the formation of the twinned structure.

Under ambient conditions, tellurium adopts a chain phase in the crystalline state with the minimum formation energy, while other stable cluster structures such as $Te_8$ and $Te_{10}$ rings have slightly higher energies in the amorphous state. In general, two relevant bonding parameters, the tellurium bond angle and its coordination number, determine the formation energy and stability in different tellurium phases. These parameters in different phases are shown in Table 1 below. Bond angles ($\Theta$) of these stable structures vary in a narrow range between about 90° and about 110°. Moreover, a coordination number (CN) of 2 is energetically favorable for individual tellurium atoms. This is largely attributed to the outer shell electronic structure (s2p4) of the tellurium atom, in which the s-electron can be treated as a core state due to the large s-p separation. The p4 valence electrons are left alone and form two covalent bonds with the neighboring tellurium atoms as well as one lone pair. Table 1 also shows that dihedral angles ($\Phi$) in different stable tellurium structures can vary in a large range. These features shown in the Table 1 are believed to be critical to comprehending the unique conformation of twinned 2D tellurium crystals.

TABLE I

| | Bulk Te | $Te_8$ ($D_{4d}$) | $Te_8$ ($C_2$) | $Te_8$ ($C_{2v}$) | $Te_{10}$ ($D_{5d}$) |
|---|---|---|---|---|---|
| $\Theta$ (°) | 103.1 | 107.2 | 89-102 | 103.5/112.2 | 102.8-111.8 |
| CN | 2 | 2 | 2, 3 | 2 | 2 |
| $\Phi$ (°) | 100.7 | 99.7 | 32-104 b | 63.8 | 71.7-120.1 |

The notations in parentheses indicate point groups.

Figure 4A:
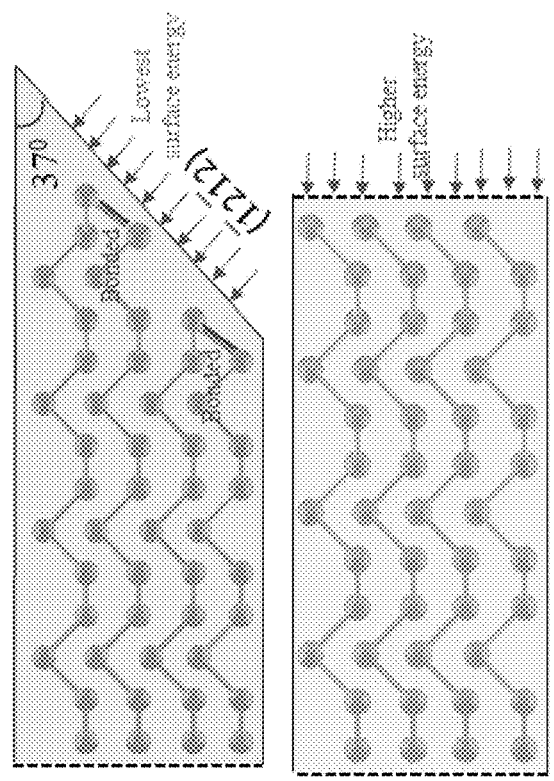
FIGS. 4A through 4E are images that characterize certain aspects relating to the growth mechanism of the twinned two-dimensional tellurium crystals of FIG. 1A.
Figure 4B:
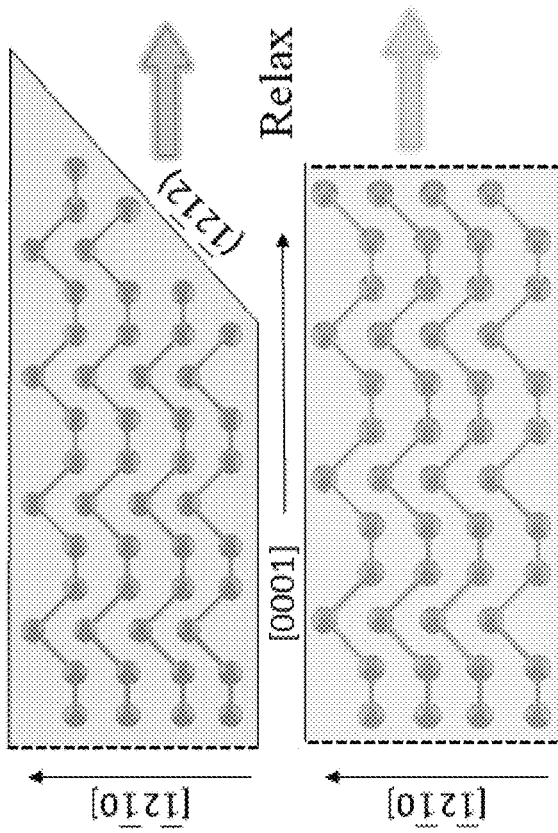

From FIGS. 1A and 1B, the frequently observed twin angles around 76 degrees indicates that the angle between the [0001] direction and the twinning plane is around $\Phi=38$ degrees. To understand why this specific geometry frequently occurred, extensive surface free energy calculations were performed for a variety of possible planes along the tellurium crystal growth direction. These calculations indicated that the [$\bar{1}2\bar{1}2$] plane shown in FIG. 4A with an acute angle of 37 degrees has the lowest surface free energy, which is about 15.57 $mJ/m^{-2}$ lower than that of the (0001) surface (FIG. 4B). The result clearly follows the Gibbs-Curie-Wulff theorem, which states that the shape of an equilibrium crystal is obtained by minimizing the total surface free energy, according to the Gibbs thermodynamic principle. This result is also consistent with experimental observation. For the chain structure cut by the [$\bar{1}2\bar{1}2$] surface (FIG. 4B), two neighboring chains at the crystal growth front with one atom difference form a closure loop to achieve the lowest surface energy with the coordination number of 2 for all tellurium atoms. Further calculations showed that other high-index planes or even the low-index (0001) surface (FIG. 4B) has higher surface energies, indicating these planes should not appear in Wulff construction and should not belong to the equilibrium shape.

Figure 4C:
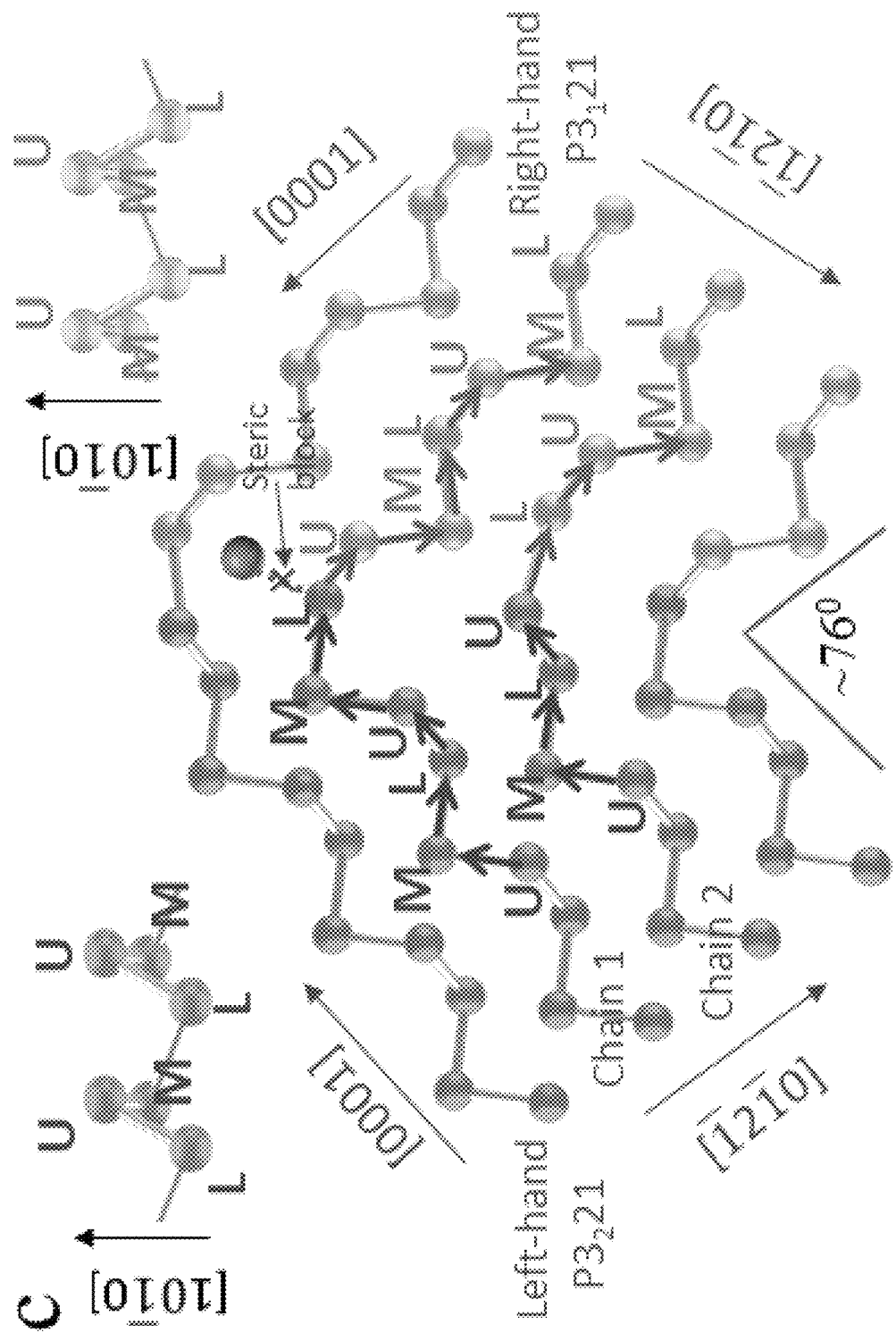

Considering the formation of the twin boundary in FIG. 1D, when the crystal growth is disrupted by PVP binding or mechanical perturbations, the lowest free energy ($\bar{1}2\bar{1}2$) surface becomes the interface between the two wings, similar to the formation of twinned structures in noble metals. The HRTEM image (FIG. 2G) clearly shows that the lefthand and righthand wings are directly bonded in the twinning plane. If each chiral chain is viewed as a three-layer structure, then the upper-layer, the mid-layer, and the lower-layer atoms in each chain of the left and right wings can be defined as L-U, L-M, L-L, R-U, R-M, and R-L atoms, as represented in FIG. 4C. To determine the realistic bonding structure at the twinning plane, the formation energies are calculated for all possible twin plane conformations (such as an L-U atom bonded with an R-M or an R-L atom, and an L-M atom bonded with an R-U or an R-L atom, etc.). The stable structures sorted are further verified by the phonon dispersion calculations. The most stable conformation is shown in FIG. 4C. Unlike many twinned structures in metals, the twinned 2D tellurium is asymmetric near the twinning plane. Note that only the upper-layer and the lower-layer atoms (but not the mid-layer atoms) form the ($\bar{1}2\bar{1}2$) twinning plane, as represented in FIGS. 4A and 4C. To better explain the structure, one chain having an L-L end atom at the left wing is defined as chain 1 and one chain having an L-U end atom at the left wing is defined as chain 2. It is apparent that the left wing chain 1 which has a lefthanded chirality follows the sequence of L-U-M along the [0001] direction toward the twinning plane. Once the growth is blocked at the L-L end atom (due to PVP binding or mechanical perturbations), the next bonding tellurium atom turns around to initiate the growth of the righthanded chiral chain from the twinning plane, which follows the same L-U-M sequence, preventing the growth of the original lefthanded chain, as indicated as a steric block in FIG. 4C. Note that the L-M L-L R-U atoms maintain the helix chain conformation (although toward the [0001] direction of the right wing) to lower the free energy. However, for the left wing neighboring chain 2 the scenario is somewhat different. The L-U atom at the end of chain 2 cannot connect a R-M atom to maintain the helix due to the steric block effect (the position is occupied by the R-M atom in chain 1, as indicated in FIG. 4C). The next bonded tellurium atom has to be an R-L atom in the righthanded chain according to our formation energy calculation. In these two representative cases, all the new chiral bonding angles involved during the twin plane formation vary from 95 to 106 degrees (FIG. 4C), consistent with energetically favorable values shown in Table 1.

Figure 4D:
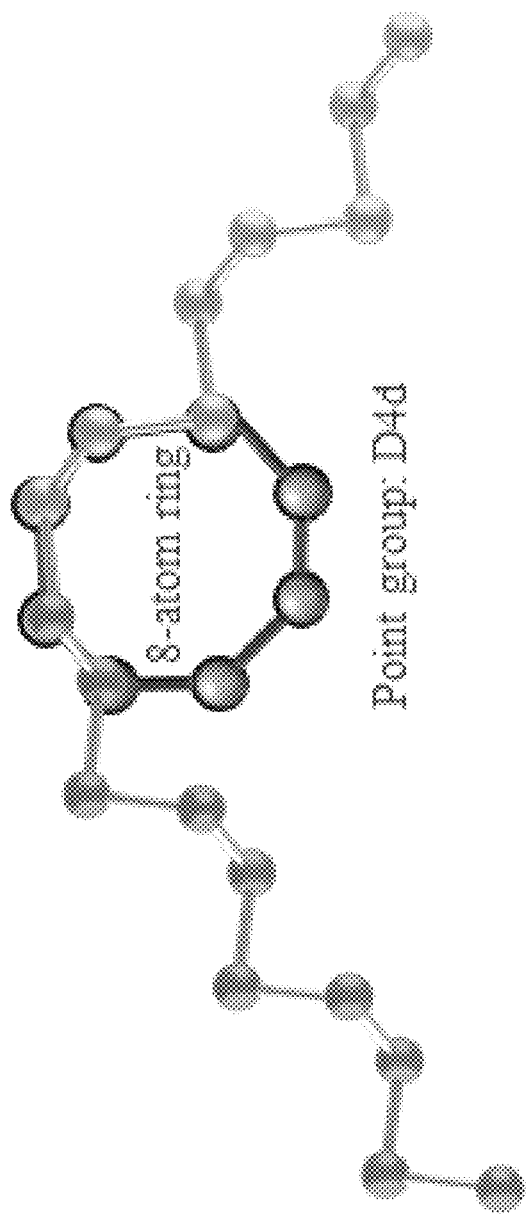
Figure 4E:
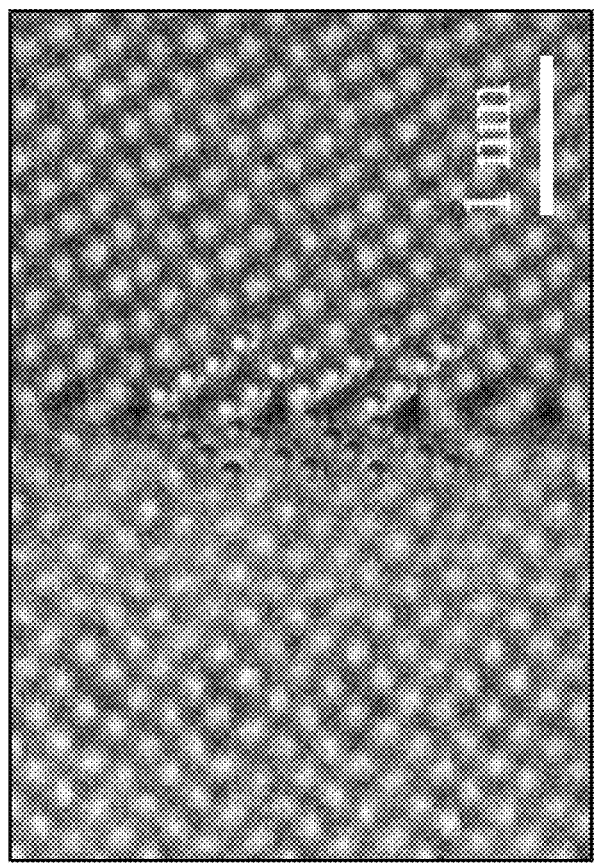

The overall DFT predicted atomic conformation near the twinning plane matches extremely well with the HRTEM image, as shown in FIG. 4E. Interestingly, a comparison of the five-atom conformation near the twinning plane with the well-known $D_{4d}$ $Te_8$ ring structure (FIG. 4D), the partial ring structure of this conformation is clearly identified. It was concluded from this investigation that one can control the ring/chain formation by the PVP surface binding, which sheds new light on a long-standing issue concerning the fundamental mechanisms of the transition between crystalline and amorphous states of tellurium.

In view of the foregoing, a successful strategy is provided to synthesize twinned 2D tellurium with two co-existing opposite chirality, which is believed to have not been achieved previously. The interfacial boundary of the twinned 2D tellurium was analyzed by HRTEM and the growth mechanism was explored. Furthermore, CD spectra further verified the chirality and showed a strong non-linear optical response. This result suggests the possibility of designing a chiral 2D nanostructure and might assist with the development of spintronics and other unconventional physical phenomena.

While the above describes aspects of one or more inventions in terms of particular embodiments and investigations, it should be apparent that alternatives could be adopted by one skilled in the art. For example, process parameters such as temperatures and durations could be modified, and appropriate materials could be substituted for those noted. As such, it should be understood that the intent of the above detailed description is to describe the particular embodiments represented in the drawings and certain but not necessarily all features and aspects thereof, and to identify certain but not necessarily all alternatives to the particular embodiments represented in the drawings. Accordingly, it should be understood that the invention is not necessarily limited to any particular embodiment described herein or illustrated in the drawings. It should also be understood that the purpose of the above detailed description and the phraseology and terminology employed therein is to describe the investigations and not necessarily to serve as limitations to the scope of the invention. Therefore, the scope of the invention is to be limited only by the claims.

The invention claimed is:

1. A substrate-free twinned 2D tellurium crystal with co-existing opposite chirality, the twinned 2D tellurium crystal comprising a first wing and a second wing that coexist and are separated by a twinning boundary, each of the first and second wings having a crystal structure made up of a plurality of spiral chains of bonded tellurium atoms, the first wing and second wing having opposite chirality, and the first wing and the second wing are joined together at the twinning boundary at an angle to form a V-shaped crystal, each of the first and second wings having an atom arrangement at the twinning boundary where three tellurium atoms per turn in each spiral chain form obtuse angles that exhibit a mirror symmetry with the twinning boundary as center line.

2. The substrate-free twinned 2D tellurium crystal of claim 1, wherein the angle between the first wing and the second wing of the V-shaped crystal is angles ranged from 73 to 78.5 degrees.

3. The substrate-free twinned 2D tellurium crystal of claim 1, wherein the angle between the first wing and the second wing of the V-shaped crystal is 76.2±0.80 degrees.

4. The substrate-free twinned 2D tellurium crystal of claim 1, wherein the first wing and the second wing each independently has a width of 10 to 20 nm.

* * * * *